B. A. BEHREND.
DYNAMO ELECTRIC MACHINE.
APPLICATION FILED MAR. 14, 1907.
922,245.
Patented May 18, 1909.
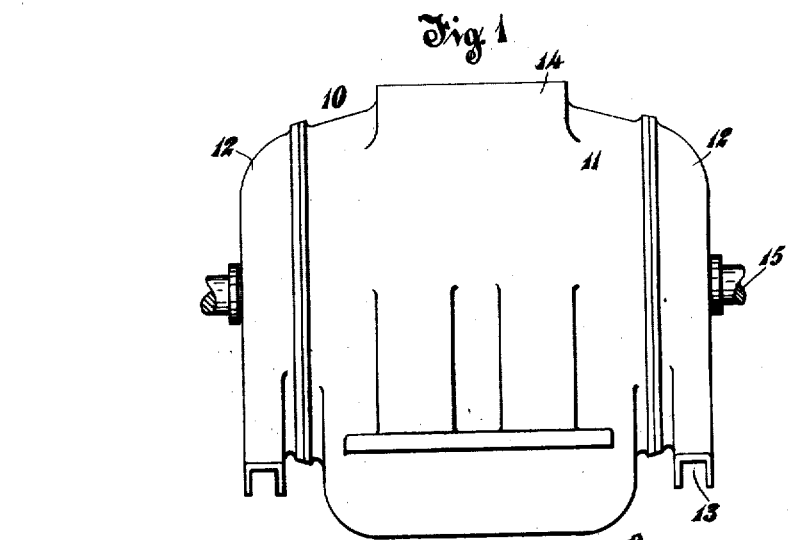
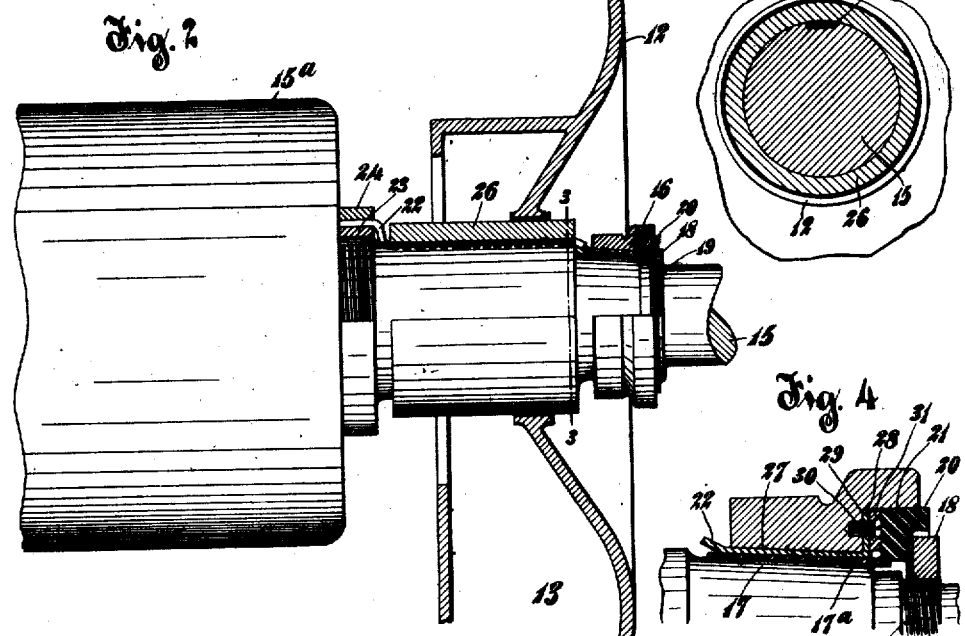
Witnesses
Oliver J. Harman
Fred J. Kinsey
Inventor
Bernard A. Behrend
By
Chas. E. Lord
Attorney

UNITED STATES PATENT OFFICE.

BERNARD A. BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 922,245.     Specification of Letters Patent.     Patented May 18, 1909.

Application filed March 14, 1907. Serial No. 362,262.

*To all whom it may concern:*

Be it known that I, BERNARD A. BEHREND, a citizen of the United States, residing at Norwood, in the county of Hamilton and State of Ohio, have invented certain new and useful Improvements in Dynamo-Electric Machines, of which the following is a full, clear, and exact description.

My invention relates to dynamo-electric machines and particularly to the novel means for supporting the collector leads of high speed field magnets and for fastening or securing the leads to collector rings.

It is now common to inclose machines in casings or housings and to supply air as a cooling medium to the stator, to prevent an excessive rise of temperature. The collector rings for the rotary field magnets are usually mounted on the shaft outside of the housing so that access can be had to the brushes, the collector leads being brought out along the shaft through the shaft openings in the housing and connected to the collector rings. The leads are usually connected to the rings by being fastened to the ends of axial studs or bolts extending outward from the rings. In machines of exceedingly high speeds it is necessary to reduce the outer diameter of the collector rings as much as possible in order that their peripheral speed may not be excessive. In such machines the usual means for connecting the leads to the rings is impracticable for the reason that the holes for the axial studs would weaken the rings and shorten the life of the latter by reducing their wearing depth. Furthermore at the enormous speeds at which these rotary members are driven the axial studs would be bent outward by centrifugal force and the connections between the leads and studs would be broken.

One of the objects of my invention is to provide improved supporting means for the collector leads between the rotary field member and the collector rings.

A further object is to provide improved means for connecting the collector leads to the collector rings which will be suitable and reliable for any speed of rotation.

My invention consists in certain novel details of construction and combinations and arrangements of parts described in the specification and set forth in the appended claims.

For a better understanding of my invention, reference is had to the accompanying drawings, in which—

Figure 1 is an elevation of an inclosed machine of the type for which my invention is intended; Fig. 2 is an enlarged partial sectional view; Fig. 3 is a sectional view along the line 3—3 of Fig. 2; and Fig. 4 is an enlarged sectional view showing more clearly the means for connecting the collector leads and rings.

Referring now to the figures of the drawings, 10 represents a housing inclosing the stator and rotor of a high speed machine, composed of a central or middle member 11, and two end members 12. The end members are provided with air admission chambers 13 open at the bottom, which may be connected to a source of air supply, and the main central portion is provided at the top with an opening or chimney 14 through which the air may escape after passing through the machine. The end members 12 of the housing are each provided with a shaft opening through which the shaft 15 extends. As is shown in Fig. 2 the admission chambers of the end members are provided with circular openings around the shaft through which openings air may pass to the middle portion 11 of the housing. When the machine is in operation, a sufficient volume of air will be caused to pass, preferably by fan blades on the rotor, into the admission chambers and then through the stator core and out through the opening or chimney 14.

Mounted on the shaft within the housing is the rotary member or rotor 15ᵃ of a dynamo-electric machine, in this case the rotary field magnet of a high speed turbo-alternator. Also mounted on the shaft, in this case at each end of the machine and on the outside of the housing, is a collector ring or slip ring 16. If desired, however, both rings may be at the same end of the machine. As is shown the rings are mounted on inclined portions 17 of the shaft, being separated therefrom by suitable insulation 17ᵘ. The diameter of the shaft outside of the housing and the thickness of the collector rings are made as small as possible so that the peripheral speed of the collector rings and the peripheral speed of the shaft within the bearings (not shown) are as small as possible. Each of the slip rings is clamped tightly on the shaft and retained in position by a nut 18 which engages a threaded portion 19 of the shaft. A ring 20 of fiber, or other insulating material, is interposed between the nut and ring. As is shown, the collector ring is provided on the side remote from the rotor with a recessed portion 21 in which the insulating ring is located. The nut is also either partially or wholly located within the recessed portion. The insulating ring is thus protected against injury or displacement and the machine is considerably shortened.

At 22 is shown a collector lead or conductor which connects one end of the field magnet winding (not shown) with one of the collector rings. The lead which preferably consists of one or more layers of strap copper extends from the field magnet between a nut 23 and a ring 24, into a longitudinal slot or groove 25 in the shaft, which slot or groove extends from a point within the housing adjacent the field magnet to a point outside of the housing a short distance from the collector ring. Surrounding the grooved or slotted portion of the shaft and fitting tightly thereon is a cylindrical sleeve or collar 26 which retains the lead in position and prevents its accidental displacement by centrifugal action. The lead is of course carefully insulated from the retaining and protecting members. As is shown the wall of the end portion 12 of the housing fits closely around the sleeve, which thus not only retains the lead in position in the slot or groove but acts as a stuffing sleeve to prevent the moist or oil laden air from the immediate vicinity of the machine from being drawn into the shaft opening. The clearance between the sleeve and the wall of the housing is just sufficient to prevent engagement between said parts. A sleeve 26 is employed at each end of the machine.

As was stated before, the methods usually employed for connecting the collector leads to the collector rings are unsuitable for machines, the rotary members of which are driven at exceedingly high speeds, such as the speed at which the field magnets of two pole, sixty cycle, turbo-alternators are driven. As is shown in Figs. 2 and 4 the lead is clamped between the shaft and the ring, being located in a groove or slot 27 in one of said members, in this case the ring, the groove extending across the portion of the ring which bears on the shaft. This portion of the lead is of course uninsulated so that a good electric connection is secured. The end 28 of the lead as is shown is bent outward into engagement with the side or shouldered portion 29 of the ring and is clamped thereto by the nut 18 and insulating ring 20. Thus it is seen that the lead is held tightly against the ring on two sides thereof and good electrical connection is secured by the pressure between the ring and shaft and the ring and nut. This clamping action alone may be relied on for securing the lead to the ring. In this case, however, I have shown the end of the lead fastened positively to the ring by one or more screws 30, the heads of the screws being countersunk in a block or strip 31 of metal preferably brass or copper. The fiber ring 19 is notched to receive the block 31 and end of the lead. It is to be understood that both collector leads are supported, and connected to the collector rings in the manner shown.

It will be seen that the collector leads are so well supported between the field magnets and the rings that there is no danger of their being broken or displaced by centrifugal action. Also the leads are connected to the rings without weakening the latter or limiting their wearing depth, and are so securely connected thereto that excellent electrical and mechanical connections are obtained.

I do not wish to be confined to the exact details shown but aim in my claims to cover all modifications which do not involve a departure from the spirit and scope of my invention.

What I claim as new is:—

1. In a dynamo-electric machine having an inclosing housing provided with shaft openings, a rotor provided with a shaft extending through said shaft openings, said shaft having a longitudinal groove or slot, a collector lead located in the groove or slot, and means for retaining said lead in position, said means surrounding the shaft and rotatable therewith and insulated from the lead, the walls of the housing fitting closely around said retaining means.

2. In a dynamo-electric machine, a rotor provided with a shaft, a stator provided with an inclosing housing having a shaft opening through which said shaft projects, said shaft having a longitudinal groove, a collector lead located in said groove, and a sleeve rotatable with the shaft surrounding said grooved portion of the shaft and located in the opening in the housing, and means for insulating the lead from said shaft and sleeve.

3. A dynamo-electric machine, comprising a stator having an inclosing housing provided with a shaft opening, a rotor provided with a shaft extending outwardly through said opening, said shaft having a longitudinal slot adjacent the opening in said housing, a collector lead provided in the slot, a sleeve surrounding the shaft and lead at the shaft opening in the housing and rotatable with said shaft, said sleeve being insulated from said lead and serving to retain the lead in position in said groove or slot, a collector ring on the shaft outside of said housing, and means for fastening the extreme end of said collector lead to said ring.

4. In a dynamo-electric machine, a rotor shaft carrying a core and winding, a collector ring mounted on the shaft, a collector lead connecting the winding and the collector ring, said lead extending through the ring, between the shaft and ring, and having its extreme end bent outward, and means for forcing the end of the lead into contact with the side of the ring.

5. In a dynamo-electric machine, a rotor shaft carrying a core and winding, a collector ring mounted on the shaft, and a collector lead connecting the winding and the ring, said lead passing through the ring, between the shaft and ring in a groove or slot in one of said members, and having its extreme end bent outward and fastened in contact with the side of the ring remote from the core and winding.

6. In a dynamo-electric machine, a rotor shaft having a core and winding, a collector ring on the shaft, said ring having a recess on the side remote from the core and winding, a collector lead extending under the ring and having its end bent outward into said recess, and means for clamping the end of the lead in contact with the ring.

7. In a dynamo-electric machine, a rotor shaft, having a core and winding, a collector ring having on the side remote from the rotor core an annular recess, and a collector lead extending from the rotor winding to the ring passing between the shaft and the ring, and having its end bent outward in said recess, and means for clamping the lead to the side of the ring.

8. In a dynamo-electric machine, a shaft, a collector ring, a collector lead, and unitary means for clamping the ring to the shaft and the lead to the ring.

9. In a dynamo-electric machine, a shaft, a collector ring, a collector lead, and a nut for clamping the ring to the shaft and the lead in contact with the ring.

10. In a dynamo-electric machine, a shaft having an inclined portion, a collector ring seated on said inclined portion, a collector lead extending along the shaft to the ring, and a nut surrounding the shaft for holding the ring in position and for clamping the lead in contact with the ring.

11. In a dynamo-electric machine, a shaft, a collector ring mounted on the shaft, a collector lead made of a continuous strip of conducting material extending through the ring between the shaft and ring in contact with the inner surface of said ring, said lead having its extreme end bent outward in contact with the side of the ring, and means for fastening the end of the lead to the ring.

12. In a dynamo-electric machine, a rotor shaft carrying a core and winding, a collector ring, and a collector lead made of a continuous strip of conducting material connecting the winding and ring, said lead extending through an opening in the ring in electrical contact with said ring to the side of the latter remote from the core and winding, and means for fastening its extreme end to the remote side of the ring.

In testimony whereof I affix my signature, in the presence of two witnesses.

BERNARD A. BEHREND.

Witnesses:
ARTHUR F. KWIS,
FRED J. KINSEY.